Dec. 26, 1967 S. KITROSSER 3,359,877
PHOTOGRAPHIC FILM HOLDER
Filed April 30, 1965
2 Sheets-Sheet 1

INVENTOR
SAMUEL KITROSSER
BY Stanley Belsky
ATTORNEY

Dec. 26, 1967  S. KITROSSER  3,359,877
PHOTOGRAPHIC FILM HOLDER
Filed April 30, 1965  2 Sheets-Sheet 2

INVENTOR
SAMUEL KITROSSER
BY Stanley Belsky
ATTORNEY

United States Patent Office 3,359,877
Patented Dec. 26, 1967

3,359,877
PHOTOGRAPHIC FILM HOLDER
Samuel Kitrosser, Lexington, Mass., assignor to Avant Incorporated, Lincoln, Mass., a corporation of Massachusetts
Filed Apr. 30, 1965, Ser. No. 452,140
8 Claims. (Cl. 95—13)

This invention relates to improved photographic film holders. More particularly, it relates to improved photographic film holders for self-processing photographic film packs adapted to be used with camera backs that accept lock-rib type film holders.

Press type cameras, such as those manufactured by the Graflex Corporation of Rochester, N.Y., and sold under the trademark "Speed Graphic," have backs that are equipped with backs commonly known in the trade as "Graflock" adapted for receiving lock-rib type film holders. The camera back is provided with a rib and a parallel groove on opposite edges for coupling to the back. In addition, the other pair of opposed edges are provided with a locking mechanism. This is a slideable device which, when the film holder is in place, holds the holder in coupling engagement with the camera back. In addition, velour-like strips are provided on the camera back which, in cooperation with the rib and groove, provide a light seal for the unexposed film when the holder is in place. The location of the plane of unexposed film in the film holder relative to the camera back is critical for obtaining sharp, clear photographs. Standards are set forth for its location by the American Standard Association, and are published in their Standard PH3.26—1951. Prior art attempts to adapt film holders for self-processing film of the type manufactured by the Polaroid Corporation, Cambridge, Mass., have led to film holders in which the film plane is not located with reference to the camera back in accordance with the aforementioned standards. Thus, modification of the primary camera was required to compensate for the difference between the standard location of the film to the camera back to the actual location as provided by the film holder.

It is therefore an object of this invention to provide an improved photographic film holder for use with camera backs accepting "lock-rib" holders for self-processing photographic film, in which the film is located in the camera focal plane.

Another object of the invention is to provide an improved photographic film holder of the lock-rib type which is simple to manufacture and use.

In accordance with the invention, there is provided an improved photographic film holder for self-processing photographic film packs. The holder is adapted for coupling to a camera back so that the film to be exposed is in the focal plane of the camera. The holder comprises a housing that has a first compartment formed therein for receiving the film pack. A second compartment is formed in the housing containing processing means for processing the film as it is transported therethrough. The housing has at least one flat wall adapted to be coupled in face-to-face contact with the camera back. The wall has an aperture formed therein to enable imaging light to expose the film. In addition, the wall has a thickness predetermined to locate the film to be exposed in the camera focal plane. An elongated groove is formed in the wall adapting the holder for coupling to a complementary rib formed in the camera back. A first light sealing means is provided coupled to the groove for preventing non-image forming light from exposing the film. The rib extends from the wall elongated parallel to the groove for insertion into a complementary groove in the camera back, thereby providing a second light sealing means. Coupling means adapt the film holder for coupling to the camera back.

For a better understanding of the present invention, together with other and further objects thereof, reference is made to the following description taken in connection with the accompanying drawings, and its scope will be pointed out in the appended claims.

Figure 1:
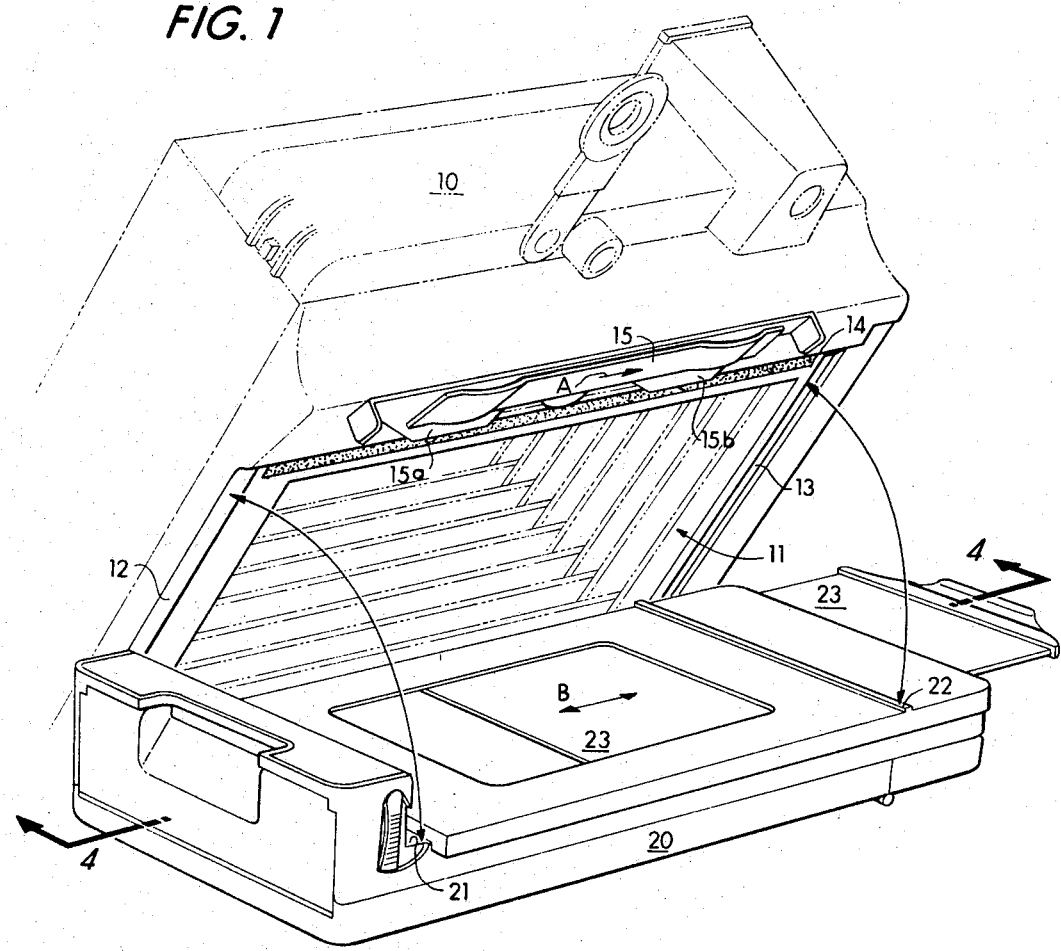
FIG. 1 is a perspective view showing the assembly of a photographic film holder embodying the present invention to a camera back.

Referring now in more detail to the drawings and with particular reference to FIG. 1, there is here illustrated a photographic film holder embodying the invention prior to assembly to a camera back. In FIG. 1 the camera is generally designated by the numeral 10 and the photographic film holder by the numeral 20. While the general camera body is shown in phantom lines in FIG. 1, the portions of the camera back which couple to the photographic film holder are shown in solid lines for emphasis. As can be seen, the camera back has a generally rectangular opening 11 formed therein to allow imaging light to enter the photographic film holder and expose the film. One edge of the back is formed with a rib 12 while its opposed edge has formed therein an elongated groove 13. The rib 12 and groove 13 upon assembly interlock, respectively, with an elongated groove 21 and a parallel elongated rib 22 formed in the holder 20. The rib 12 and groove 13 on the camera back provide light seals when the photographic film holder 20 is in place. The other two edges of the camera back are provided with resilient light seals, one of which is shown at 14 as a strip of velour-like material. The other edge of the camera back not shown has a similar strip. There is further provided on the back a locking mechanism 15 which slides in the direction of the arrow A. This type of locking mechanism is typical of the type used on cameras equipped with a locking mechanism known in the trade as a "Graflock" lock. As the slide is moved in the direction of the arrow A, the tabs 15a and 15b engage the film holder 20 and hold it in place against the back. A similar locking mechanism is provided on the lower edge of the back but is not shown. Also shown in FIG. 1 is a slideable dark slide 23 that is made of an opaque material. When the slide is pushed all the way in, it prevents non-image forming light from reaching unexposed photographic film in the film holder 20. After the photographic film holder 20 is coupled to the camera back, the slide 23 is removed to allow photographic exposure of the film.

Figure 2:
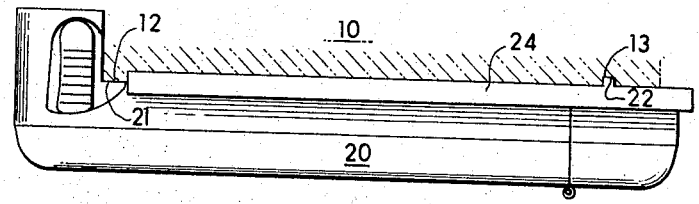
FIG. 2 is a front elevation view of the photographic film holder shown in FIG. 1.

In FIG. 2 there is here illustrated a front elevational view of the photographic film holder 20. The photographic film holder has a front wall 24 which engages the back of camera 10 by surface-to-surface contact. Formed in the front wall 24 of the photographic film holder 20 is an elongated groove 21, and a parallel elongated rib 22 extends therefrom. The groove 21 couples to the rib 12 extending from the back of camera 10, while the rib 22 couples to an elongated groove 13 formed in the back of camera 10. The wall 24 extends beyond the edge of the photographic film holder and provides coupling means in the form of a flange.

Figure 3:
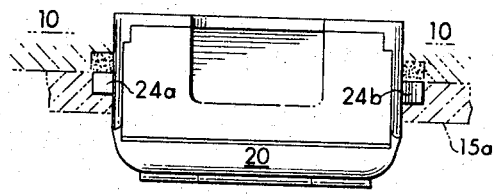
FIG. 3 is a side elevation view of the photographic film holder taken from the left of FIG. 2.

In FIG. 3 there is illustrated an end view of the film holder 20 taken from the left of FIG. 2. As can be seen in FIG. 3, the front wall 24 provides flanges 24a and 24b on opposite sides of film holder 20. As shown on the right-hand side of FIG. 3, the flange 24b is engaged by the tab 15a of the camera locking mechanism 15. When in the locked position, the flange 24b is pressed against the light seal 14 provided in the back of the camera 10. The flange 24a is similarly engaged to the back of the camera 10, thus, the housing when coupled to the camera back is sealed by the flanges and the ribs and grooves previously described in FIG. 2.

Figure 4:
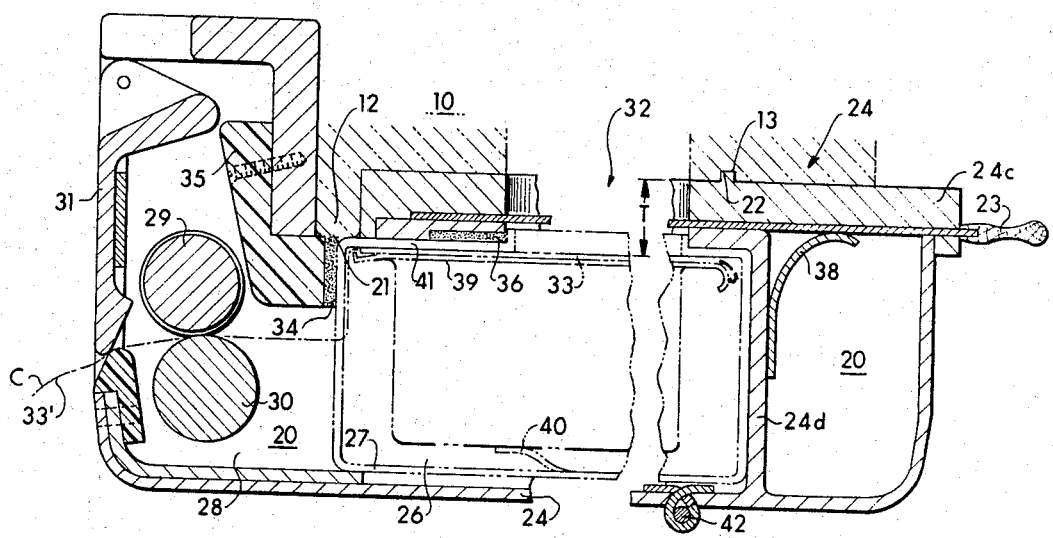
FIG. 4 is a cross-sectional view of the photographic film holder taken along the line 4—4 in FIG. 1.

Referring now to FIG. 4, there is here illustrated a cross-sectional view of the photographic film holder to the camera taken along the line 4—4 in FIG. 1. For clarity the cross-section is illustrated with the holder coupled to the camera back. The photographic film holder 20 generally includes a housing 25. The housing includes a first compartment 26 for receiving the photographic film pack 27. The photographic film packs of the type useful with this invention are described for example in U.S. Patent 3,161,122 issued Dec. 15, 1964 to J. A. Hamilton and assigned to the Polaroid Corporation, Cambridge, Mass., and contain multiple sheets of self-processing film. The film is processed as it is transported through a compartment 28 formed in the housing 25. For a more detailed description of the processing apparatus shown in compartment 28, reference is hereby made to U.S. Patent 3,165,040 issued Jan. 12, 1965 to J. A. Hamilton and assigned to the Polaroid Corporation, Cambridge, Mass. Generally, the exposed film 33' is processed as it is transported, in the general direction of the dot-dash line C between rollers 29 and 30 out of the film holder through a pivotable door 31.

The front wall 24 is shown in this illustration in surface-to-surface contact with the back of the camera 10. The wall 24 is formed with an aperture 32 to allow imaging light from the camera to expose film 33. The aperture 32 is preferably of a size so that it comes within the aperture of the camera 10. The front wall 24 is of hollow construction to receive the dark slide 23. It is fabricated from a first plate 24c and a casting 24d. The front wall which has a portion that is in spaced relationship with the plate 24a to provide a hollow for receiving the dark slide 23. The surface of the plate 24c in contact with the camera back is formed with an elongated rib 22 adapted for coupling to the elongated groove 13 in the back of camera 10. In addition a slot 21 is formed in the front wall adapting the holder for coupling to the rib 12 in the camera back. First light sealing means in the form of a resilient strip 34 which may be, for example, a velour-like material, is coupled to the slot 21 by adhering it to an elongated section 35 between the processing compartment 28 and compartment 26. As shown when the film pack 27 is in place in the compartment 26, one edge of the pack contacts the light seal 34, thus preventing non-image forming light from exposing the film 33. In addition, a second seal is provided at 36 for engaging a flange 37 that forms the aperture in the film pack 27. The light seal 36 may also be made of a resilient velour-like material.

It is often desirable to change film holders before all the film in the film pack is exposed. Therefore, it is necessary that the film holder 20 be capable of maintaining light-tight conditions when there is a film pack therein and when it is disengaged from the camera. As can be seen in FIG. 4, with film pack 27 within holder 20 and the dark slide in the closed position, seals 34 and 36 prevent actinic light from entering through the opening formed by groove 21.

To prevent non-image forming light from fogging photographic film when the dark slide 23 is removed, a resilient strip 38 extends along the length of the slide and is coupled to the casting 24d. The film pack 27 has a pressure plate 39 coupled to a leaf-type spring 40. This pressure plate 39 causes the film to be pressed against the front wall 41 of the film pack 27. The dimension designated as "T" in FIG. 4 for "press-type" cameras is critical, and varies as a function of the size of film. In accordance with the standards set out by the American Standard Association in their Standard PH3.26—1951, for Photographic Double Film Holders of the Lock-Rib Type, the following table provides the preferred dimensions for "T" as illustrated:

| Film size (inches) | T+film thickness (inches) |
|---|---|
| 2¼ x 3¼ | 0.197±.007 |
| 3¼ x 4¼ | 0.197±.007 |
| 4 x 5 | 0.197±.007 |
| 5 x 7 | 0.228±.010 |
| 8 x 10 | 0.260±.016 |

Since the dimension "T" in the aforementioned standard is the distance from the front surface of the holder to the rear surface of the film, the film thickness must be subtracted from the dimension given in the standard.

The assumed film thickness by the American Standards Association is of the order of 0.010 inch. Thus, the preferred camera back to film plane distance is from substantially 0.180 inch to 0.276 inch. Since the thickness of the film pack wall is controlled by the film pack manufacturer, the thickness of the front wall 24 is selected so that, in combination with the film pack wall thickness, the film is located in accordance with the standards for the film size. The film pack 27 is loaded into the film pack holder by means of a door 41. The door forms a rear wall of the housing and is pivotable about a hinge 42.

Operation of the photographic film holder of the present invention will be described first with reference to FIG. 4. To load the film pack 27 into the holder, the door 41 is opened. The film pack is placed in position with its aperture in operative engagement with the aperture 32 formed in the wall 24. The flange 37 of the film pack engages the edge of seal 36 while one side wall of the pack engages the seal 34. With the film pack 37 thus in place, the door 41 is closed and locked by appropriate locking means not shown. The dark slide 23 is placed in the position as shown in FIG. 4. That is, it is in the closed position. The film pack 27 normally comes with its own dark slide which is now removed. The film holder at this time is completely light sealed by means of the light seals 34, 36 and dark slide 23.

Referring now to FIG. 1, the film holder is now placed with the dark slide still closed against the camera back so that the groove 21 formed in the holder and rib 22 are respectively opposite rib 12 and groove 13 in the camera back. The back is now pivoted as shown by the curved arrows in FIG. 1 so that the front wall 24 is in surface-to-surface contact with the back of camera 10. The locking means 15 is then actuated by sliding. This causes the tabs 15a and 15b to engage the flange 24b formed by the front wall 24 (see FIG. 3). A similar locking means is actuated on the bottom of the camera back and engages the flange 24a shown in FIG. 3. With the holder in this position it is completely light sealed and the dark slide 23 may be removed and exposures made. Referring again to FIG. 4, the photographic film 33 is generally provided with a tab that extends through the processing compartment 28 formed in the housing. After exposure the tab is pulled and the door 31 pivoted allowing the film to be transported through the rollers 29 and 30 and thus processed.

While there have been described or at present considered to be the preferred embodiments of the invention, it will be apparent to those skilled in the art that various changes and modifications may be made therein without departing from the invention, and it is, therefore, aimed in the appended claims to cover all such changes and modifications as fall fairly within the true scope and spirit of the invention.

What is claimed is:

1. An improved photographic film holder for self-processing photographic film packs, said film pack including a housing having one wall with an aperture formed therein to enable exposing film located in surface-to-surface contact with said wall, and said holder adapted for coupling to a camera back so that the film to be exposed is in the focal plane of said camera comprising:

a housing having a first compartment formed therein for receiving said film pack, and a second compartment having processing means therein for processing film as it is transported therethrough, said housing having at least one flat wall having a first surface adapted to be coupled in face-to-face contact with said camera housing, said wall having an aperture formed therein, whereby said film pack wall is in surface-to-surface contact with a second surface of said housing wall opposed to said first surface, said housing and pack apertures being aligned to enable imaging light to expose said film, said housing and pack walls having a combined thickness predetermined to locate the film to be exposed in said camera focal plane;

a first elongated groove formed in said housing wall adapted for coupling to a complementary rib formed in said camera back;

first light sealing means coupled to said first groove for preventing non-image forming light from exposing said film;

a rib extending from said housing wall elongated parallel to said first groove for insertion into a complementary second groove in said camera back thereby providing a second light sealing means.

2. The combination of claim 1 wherein said housing wall is hollow for receiving a slideable opaque mask to prevent non-image forming light from said holder through said aperture.

3. The combination of claim 1 further including resilient light sealing means mounted within said film holder housing for resiliently contacting said mask surface when said mask is within said hollow portion of said wall and displaceable to light seal said hollow portion of said wall when said mask is removed.

4. The combination of claim 1 wherein said combined wall thicknesses are selected to place said film at a distance substantially within the range of 0.180 inch to 0.276 inch from said wall surface adapted to contact said camera back.

5. An improved photographic film holder for self-processing photographic film packs, said pack including a housing having one wall with an aperture formed therein to enable exposing film located in surface-to-surface contact with said wall, and said holder adapted for coupling to a camera back so that the film to be exposed is in the focal plane of said camera comprising:

a housing having a first compartment formed therein for receiving said film pack, and a second compartment having processing means therein for processing film as it is transported therethrough, said housing having at least one flat wall having a first surface adapted to be coupled in face-to-face contact with said camera housing, said wall having an aperture formed therein, whereby said film pack wall is in surface-to-surface contact with a second surface of said housing wall opposed to said first surface, said housing and pack apertures being aligned to enable imaging light to expose said film, said housing and pack walls having a combined thickness predetermined to locate the film to be exposed in said camera focal plane;

a first elongated groove formed in said wall adapted for coupling to a complementary rib formed in said camera back;

first light sealing means within said first groove for contacting a side wall of said film pack;

a rib extending from said wall elongated parallel to said first groove for insertion into a complementary second groove in said camera back thereby providing a second light sealing means;

third light sealing means on said second housing surface, disposed between said aperture and said first groove.

6. The combination of claim 5 wherein said first and third light sealing means are elongated in the direction of said first groove.

7. The combination of claim 5 wherein said first and third light sealing means are a velour-like resilient material.

8. The combination of claim 5 wherein said housing wall is hollow for receiving a slideable opaque mask for light sealing said aperture, and in cooperation with said first and third light sealing prevents actinic light from exposing film in said film pack prior to coupling said holder to said camera back.

References Cited

UNITED STATES PATENTS

| | | | |
|---|---|---|---|
| 684,221 | 10/1901 | Gill | 95—11 |
| 790,123 | 5/1905 | Hall | 95—34 |
| 2,483,391 | 10/1949 | Gannon | 95—13 |

JOHN M. HORAN, *Primary Examiner.*

LEONARD FORMAN, *Examiner.*